United States Patent

Marszalek

[11] Patent Number: 5,822,402
[45] Date of Patent: Oct. 13, 1998

[54] METHOD AND APPARATUS FOR PROCESSING SYNTHESIZED SPEECH AND SYNTHESIZER VOLUME FOR CALLING LINE IDENTIFICATION DATA MESSAGES

[76] Inventor: Gary Allen Marszalek, 162 Eagle Crest Dr., South Lyon, Mich. 48178-1242

[21] Appl. No.: 641,808

[22] Filed: May 2, 1996

[51] Int. Cl.⁶ .............................. H04M 1/64; H04M 3/50
[52] U.S. Cl. ................ 379/67; 379/88; 379/142
[58] Field of Search .................... 379/88, 142, 374, 379/67; 381/57, 103

[56] References Cited

U.S. PATENT DOCUMENTS

| | | | |
|---|---|---|---|
| 5,077,799 | 12/1991 | Cotton | 381/57 |
| 5,297,198 | 3/1994 | Butani et al. | 381/57 |
| 5,467,385 | 11/1995 | Reuben et al. | 379/88 |
| 5,509,081 | 4/1996 | Kuusama | 381/57 |
| 5,566,237 | 10/1996 | Dobbs et al. | 381/103 |
| 5,615,256 | 3/1997 | Yamashita | 381/57 |

*Primary Examiner*—Daniel S. Hunter

[57] ABSTRACT

A calling number display and recording system that stores caller identification information and provides a synthesized spoken indication of the calling party. The device senses and processes the ambient background noise level and outputs the synthesized speech at a level such that the synthesized speech is intelligible given the background noise. It also modifies the volume level based on preset time intervals throughout the day.

7 Claims, 7 Drawing Sheets

METHOD AND APPARATUS FOR
PROCESSING SYNTHESIZED SPEECH AND
SYNTHESIZER VOLUME FOR CALLING
LINE IDENTIFICATION DATA MESSAGES

FIELD OF THE INVENTION

The present invention relates generally to a method and apparatus for processing an Incoming Calling Line Identification (ICLID) data message, such as "Caller I.D.", and more particularly, to a method and apparatus for processing synthesized speech for ICLID messages.

BACKGROUND AND SUMMARY OF INVENTION

In recent years, "Caller I.D." has become quite popular and is generally available throughout the U.S. and other countries. The two most popular services are "Calling Number Delivery" and "Calling Name Delivery". Basic parameters and signal data protocol relevant to a presently preferred embodiment of the present invention are described in a technical advisory entitled, "SPCS-to-CPE Data Transmitter Generic Requirements", Bellcore TA-NWT-000030, Issued Sep. 02, 1991.

Another example of such protocol is given in U.S. Pat. No: 4,582,956 issued to Carolyn A. Doughty on Apr. 15, 1986. Doughty's patent shows an ICLID visual display, which must be read by the user in order to screen calls. This can be very awkward, forcing the user to relocate to the display unit even if the user is near another extension.

Other patents include U.S. Pat. No: 4,894,861 issued to Masanobu Fujioka on Jan. 12, 1990. Fujioka searches calling parties numbers stored in a previously loaded database for a match with incoming ICLID data. If such a match exists, a speech generator notifies the recipient with a corresponding previously recorded synthesized speech message. However, no provisions are made for identifying callers not in the data base.

U.S. Pat. No: 5,265,145 issued to Boon C. Lim on Nov. 23, 1993 speaks or spells calling parties names and/or numbers using a speech synthesizer or voice reproducer. Lim enables or disables the synthesizer based upon a specified time interval(s).

Although the addition of speech synthesis in prior art is favorable, managing its volume level is just as substantial. Since background noises vary throughout the day, different synthesizer volumes are essential for obtaining optimum clarity and performance. Solely enabling or disabling a synthesizer's output is insufficient; although it gives a "Do not Disturb" type message, clarity and convenience are still compromised.

Administering volume levels to time interval(s) and/or automatically deploying volumes exceeding background noise would be more desirable, and consequently the present invention is devoted to improvements that provide novel and more desirable performance.

It is an object of the present invention to administer volume levels to time interval(s) and/or to automatically deploy volumes exceeding previously sampled background noise.

One advantage of the invention relates to operation during twilight hours. For many users, it is more desirable to announce a caller with a gentle whisper than not to announce the caller at all. Imagine an emergency call from a hospital for instance. Sometimes anxiety is reduced simply by learning the origin of a late night call. Without this knowledge, a user would, at least at certain times, contemplate looking at the display device for more information in order to decide whether to answer a call.

Another advantage of the invention is demonstrated during times of higher activity when background sounds are more predominant. During these periods, a suitable volume above background levels can automatically be set. This enhances clarity by providing a means for enabling a synthesized message to be better understood in contrast to increased background noise. An enhancement in convenience is also provided because the user does not periodically have to adjust the volume manually to compensate for background noise level changes.

It is a further object of the present invention to provide a means for automatically setting and/or updating an internal time clock from recovered ICLID data.

It is a further object of the present invention to incorporate an expansion port interface. This port may be interfaced to a plurality of special processing and/or transmitting/receiving options. Interfaces to personal computers and/or wireless transmitters/receivers for remote notification or communication are two prime examples. Remote notification receivers/transmitters may comprise, but are not limited to, television display devices, personal notification devices, and to other telecommunications equipment. Also, a personal computer interface may comprise but is not limited to, further logging and/or processing of recovered data, processing data for home and office automation solutions, and/or for redistributing recovered data to personal pagers. The notification and personal computer interface examples, are included to provide an indication of the scope of the invention, but are not limited to the examples given.

It is a further object of the present invention to enhance security and convenience by vocally warning the listener of "Private", "Out of Area" or "No Data" type ICLID messages. A considerable advantage in avoiding prank or nuisance type callers is thereby achieved.

BRIEF DESCRIPTION OF THE DRAWINGS

The present invention will be briefly described below in conjunction with the accompanying drawings depicting a presently prefered embodiment, and in which.

DETAILED DESCRIPTION OF THE PREFERRED EMBODIMENT

Figure 1:
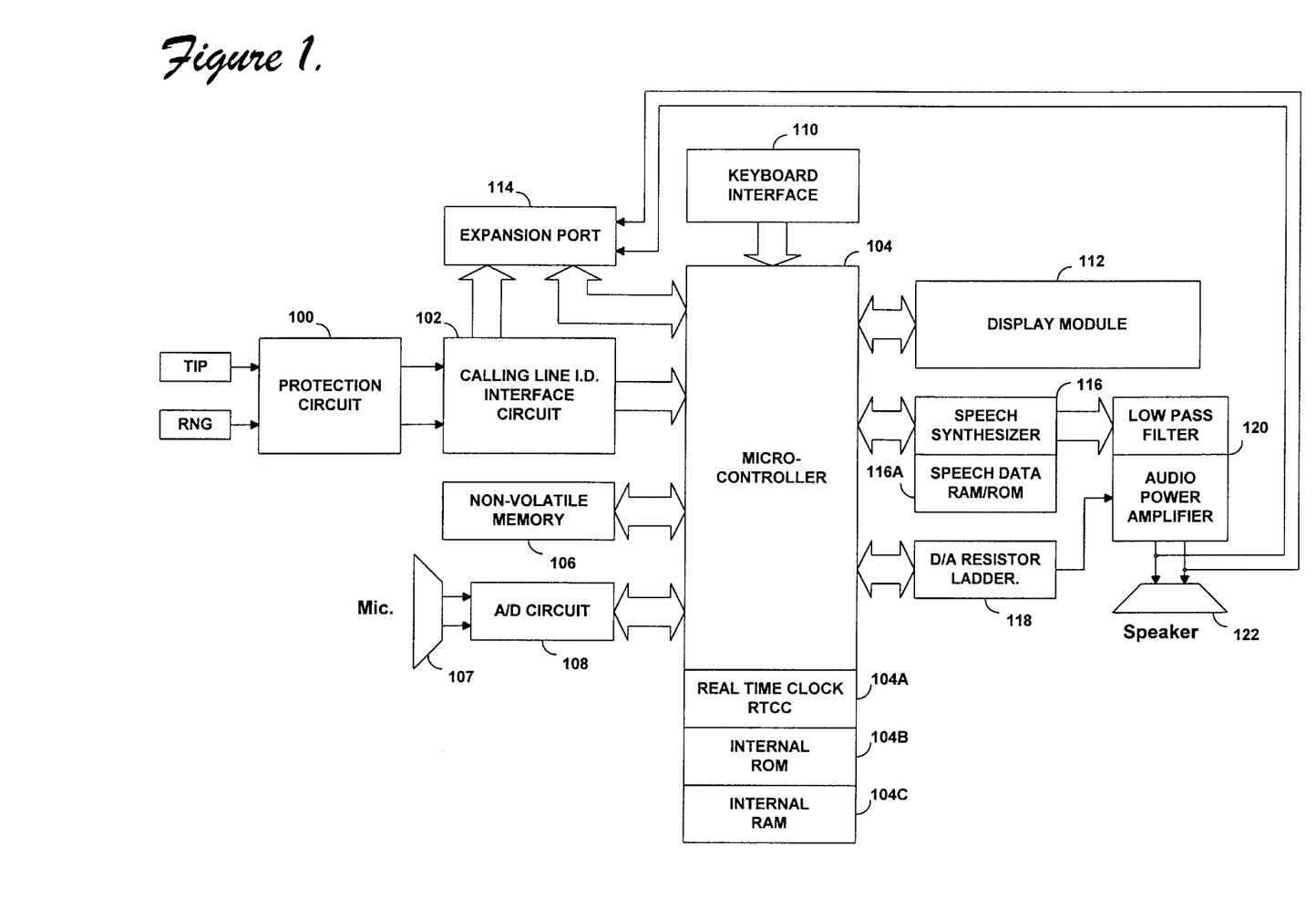
FIG. 1 is a schematic block diagram representing the basic electronics hardware configuration.

A typical block diagram of a preferred embodiment is illustrated in FIG. 1. The device is connected to the tip and ring of a standard telephone line by a protection circuit 100. This insures proper polarity and surge protection to an ICLID receiver interface 102. A microcontroller 104 sends and receives information/signals to and from interface 102, a non-volatile memory 106, an A/D circuit 108, a keyboard 110, a display module 112, an expansion port 114, a speech synthesizer 116 and a R-2R ladder network 118.

Interface 102, microcontroller 104, non-volatile memory 106 and A/D circuit 108 are all readily available commercial integrated circuits. Display module 112 may comprise discrete components, or perhaps more commonly, a 2×16 or 4×16 pre-assembled L.C.D. module.

When an incoming call is detected, interface 102 captures and transfers ICLID data/signals to microcontroller 104 and expansion port 114. Microcontroller 104 captures, configures and saves the transmitted name/number message to non-volatile memory 106. If the message contains the time, then microcontroller 104 will update the clock register and a real time clock counter (RTCC) 104A. If the incoming call is absent of ICLID time and/or ICLID data is in error, the message time will be replaced by current running time maintained in the clock register. Microcontroller 104 then transfers received ICLID date, time, name and/or number, and memory bank location or appropriate error message(s), to display module 112. Microcontroller 104 then compares incoming message time with at least one stored time interval for processing of speech synthesis volume level. If incoming message time is within user-stored time interval(s) in memory 106, microcontroller 104 then loads the appropriate corresponding user-configured volume level from memory 106. If however, the incoming message time is not within user specified time interval(s) in memory 106, microcontroller 104 then defaults to user-configured normal volume level from memory 106.

Microcontroller 104 then tests user configuration in memory 106 to see if automatic volume has been enabled. If automatic volume is enabled, ambient sound pressure average is loaded from microcontroller ram 104C and a new automatic volume level is computed accordingly. Microcontroller 104 now applies the computed digital volume to R-2R resistor ladder network 118 for proper synthesizer analog output.

Resistor ladder network 118 directly supplies DC volume control level to a filter/amplifier 120. Filter/amplifier 120 is a commercially available integrated circuit by Texas Instruments, part number TLC2470. Filter/amplifier 120 was chosen for its internal filtering, automatic power-down, DC volume control and differential audio amplifier features. Speech synthesizer 116 now synthesizes recovered ICLID data message to a speaker 122 and to an expansion port 114 accordingly. Speech synthesizer 116 is a commercially available integrated circuit by Texas Instruments, part number TMS50C20. Speech synthesizer 116 was chosen for its low cost, automatic power-down and various interfacing options.

Figure 2:
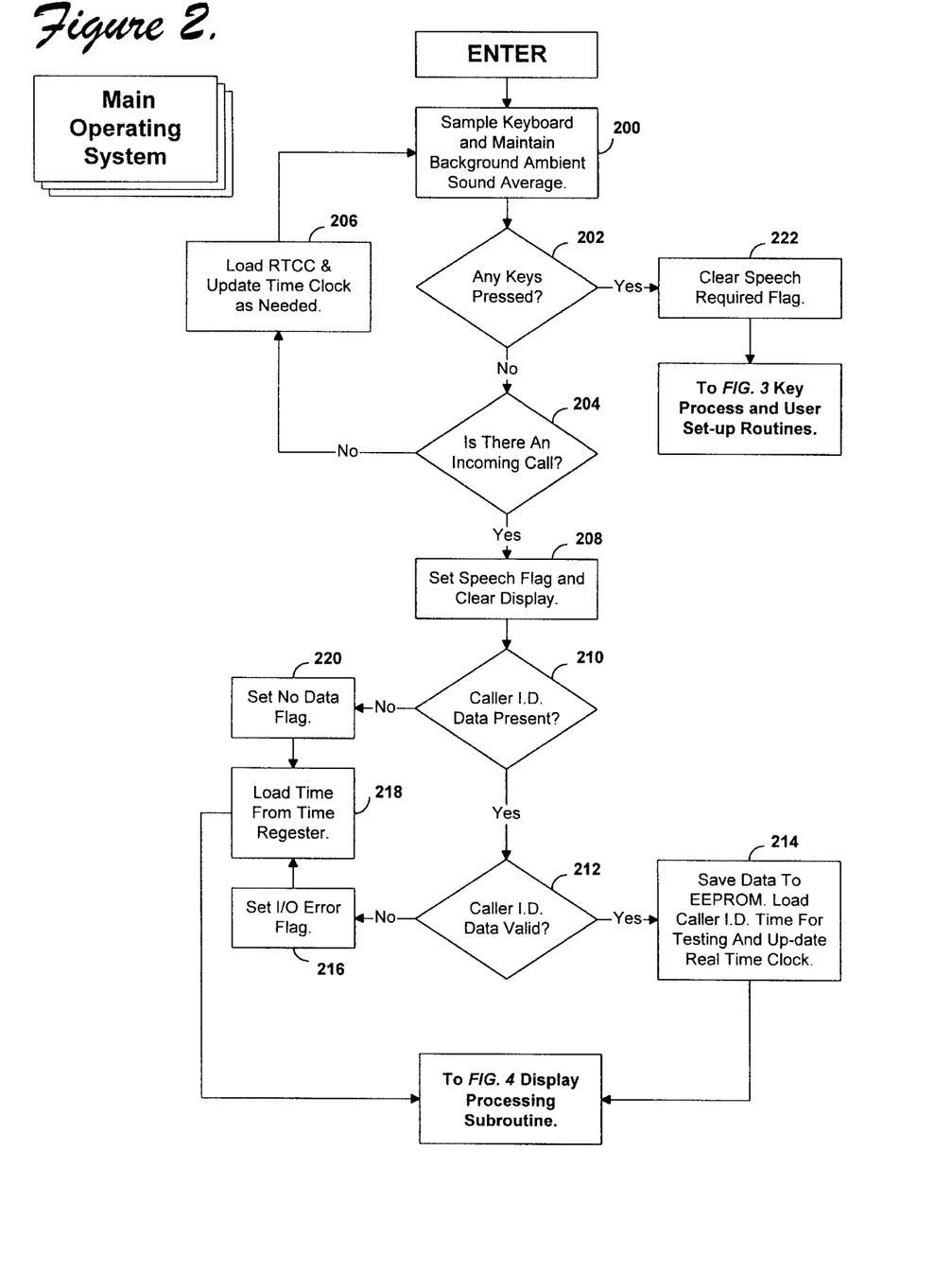
FIG. 2 is a flow chart diagram depicting a main operating loop in which keyboard and incoming messages are processed.

The flow chart depicted in FIG. 2 represents typical program flow of the main operating system for the inventive apparatus. There are typically five different paths of program flow which are dependent upon various interrupts or the absence thereof. First to be described are a representative program loop absent of any interrupts and includes initial reset sequencing.

Upon initial reset of microcontroller 104, all variables are either reset and/or loaded with literal constants or from a user-set configuration in memory 106. Microcontroller 104 then initializes display 112. If memory 106 contains messages, the most recent message is loaded and displayed. If however, memory 106 contains no messages, a logo and software version such as "CyberTel Ver. 1.0" may be written to display 112. If microcontroller 104 is not in initial reset and there are no messages to be displayed, a "No Calls" type message is sent to display 112.

A digital sample representing current background noise from a microphone 107 and A/D converter circuit 108 is now read by microcontroller 104 (process block 200). This sample is then averaged with previous samples and maintained within microcontroller ram 104C for potential automatic volume use. Microcontroller 104 then scans for any keyboard closures. If no keys are pressed (decision block 202) and no incoming call is detected (decision block 204), RTCC register 104A (process block 206) is loaded, and current time register is updated. Updating of the time register insures a valid time for both processing and/or displaying of a digital clock. If a ICLID message checksum is not valid, Bellcore specifications require the entire message be considered erroneous. For this reason, or for the absence of ICLID data, a RTCC must be maintained. This also allows for the application of a digital time clock that is automatically set every time a valid ICLID call is received. Program flow now returns back to scan keyboard switches (process block 200).

The second path depicts a typical valid incoming ICLID message and is described hereafter. If an incoming call is detected (decision block 204), microcontroller 104 will then set speech required flag and clear display 112 (process block 208) in preparation for new message(s). If ICLID data is present (decision block 210), ICLID received checksum is processed for validity. If ICLID data is valid (decision block 212), recovered ICLID data (process block 214) is saved to the next available location in non-volatile memory 106. Microcontroller 104 then sets the current time register in ram 104C using recovered ICLID data. To insure the maximum number of current messages, microcontroller 104 maintains two registers in memory 106 for message processing.

The first register maintains the total message count and increments to the maximum allowable next available location in memory 106. When this maximum value has been reached, the second register then increments to the next oldest message. This second register, which is referred to as the overbank register, maintains a pointer to the next oldest message in memory. If the first register shows that memory 106 is full, the overbank register will be utilized as the location for saving the current message. Deleting all messages resets both register pointers. Program flow then clears all error flags and transfers to FIG. 4 for display processing.

The third path depicts an incoming ICLID message but the message is in error. The third path is very similar to the second path until ICLID validity (decision block 212) is checked. There are two reasons that may cause ICLID failure at decision block 212. The first is when the checksum of the received ICLID message is invalid. The second is the expiration of allowable idle time between received characters. Both of these errors will set the I/O error flag (process block 216). Although it is possible to save an error message in memory 106 using the current time register maintained in ram 104C, it is usually preferable to discard the message and save space in memory 106 for valid messages. However, the ICLID time is replaced with the current time register in ram 104C (process block 218) to allow for processing of speech volume. Program flow then transfers to FIG. 4 for display processing.

The fourth path depicts an incoming call absent of ICLID information. Program flow proceeds as in previous examples until an incoming call is checked for ICLID information (decision block 210). A no data flag is then set (process block 220) and the current time register is loaded (process block 218) to allow for processing of speech volume. Program flow then transfers to FIG. 4 for display processing.

The fifth and final path of the main operating flow chart in FIG. 2 occurs when a key closure is detected. Program flow first scans keyboard switches (process block 200) as in all previously described paths. If a key has been pressed (decision block 202), the speech required flag is then reset (process block 222). Program flow is then transferred to FIG. 3 for key processing and user set-up.

Figure 3:
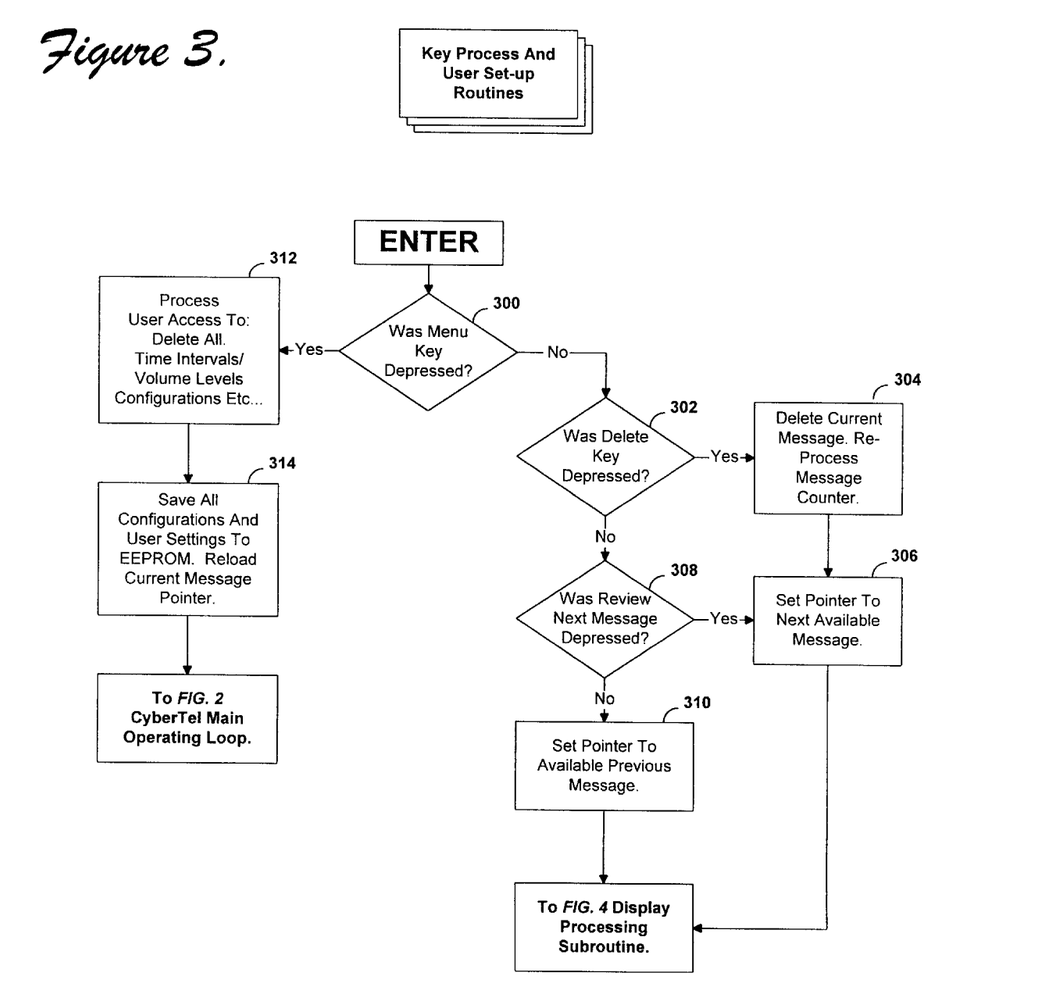
FIG. 3 is a flow chart diagram detailing keyboard and user set-up processing.
Figure 6:
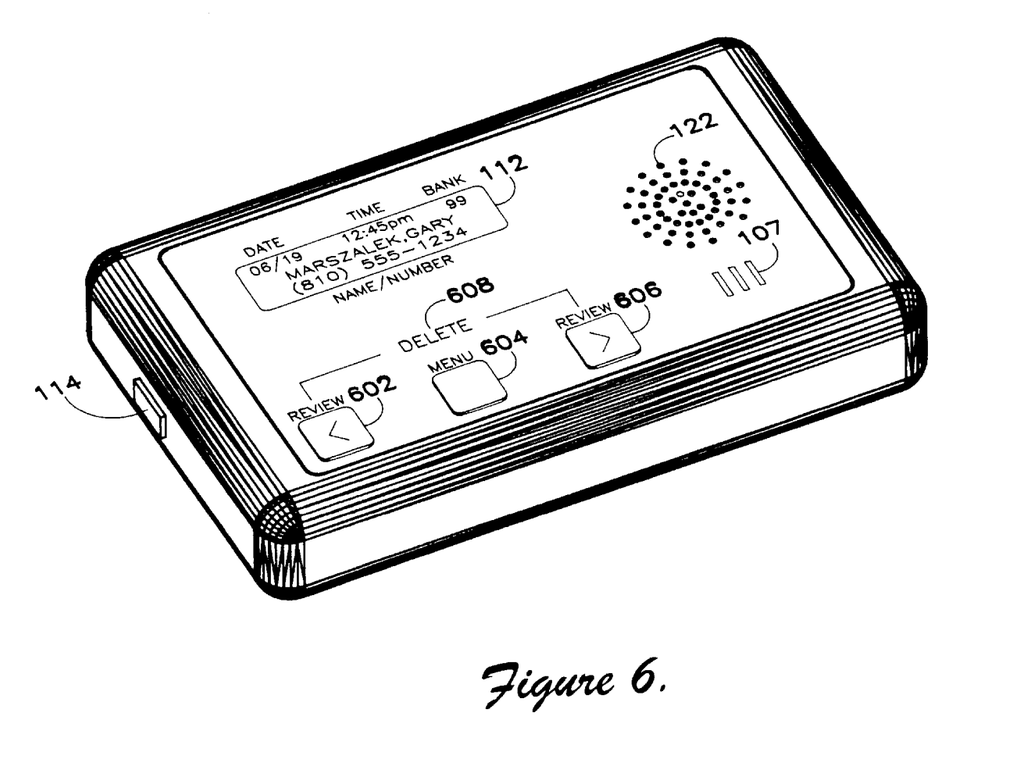
FIG. 6 is a perspective view showing a stand-alone apparatus.
Figure 7:
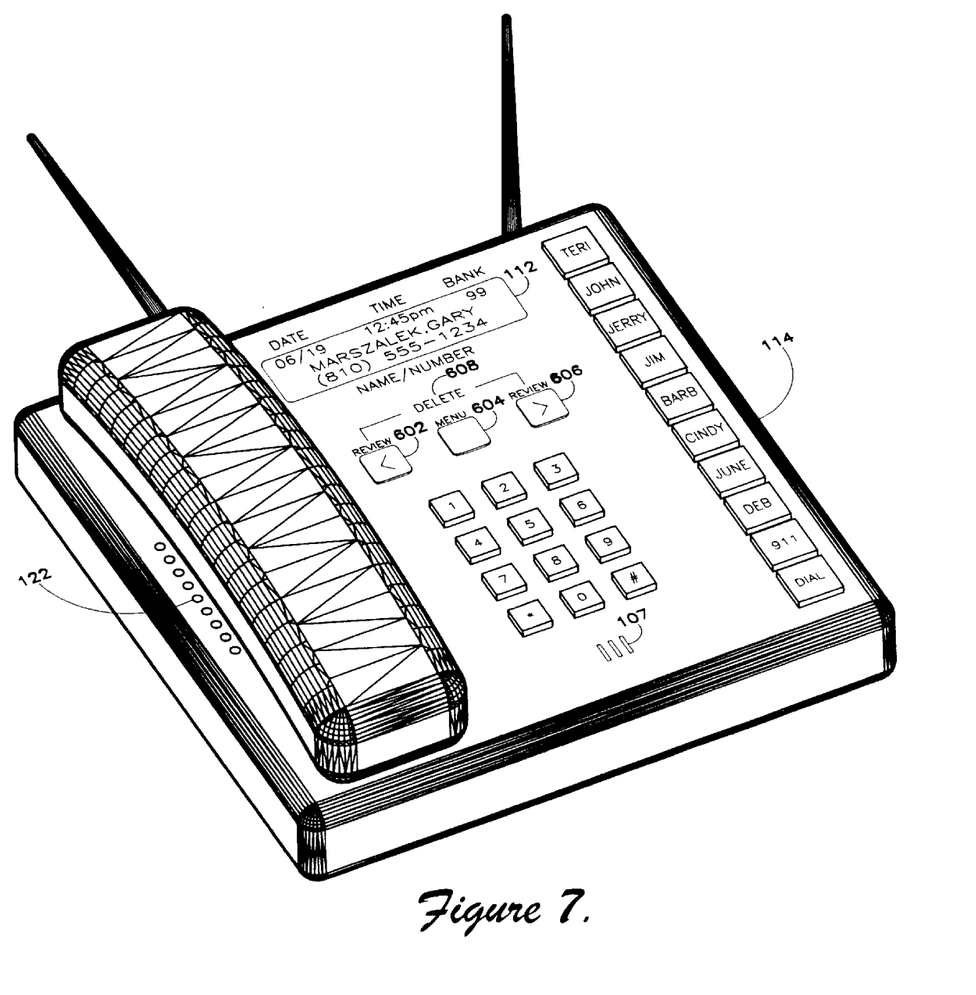
FIG. 7 is a perspective view showing an embodiment integrated within a standard telephone device.

FIG. 3 depicts a flow chart of some of the typical processing that occurs during the key processing and user set-up subroutine. First, some background regarding the keys will be given. As shown in FIG. 6., there are at least three keys which the software must process. The left-most key 602 is used to review prior stored messages. The middle key 604 is the menu key and is used to scroll through the user configuration functions. The right-most key 606 is used to review the next stored message. When the review prior key 602 and the review next key 606 are pressed simultaneously, this functions as a delete key 608. In the user configuration mode, all three keys can assume other functions as well and are prompted to the user by the display. Although it is possible to sample numerous keys, a highly compact and efficient device can be manufactured using only three. The flow chart in FIG. 3. will now be discussed.

First, we will look at the deleting and the reviewing of previously stored messages and then conclude with the processing of user mode routines. If the menu key was not pressed (decision block 300), processing for the deleting or reviewing of stored messages will be pursued. If both review keys are pressed (decision block 302), the deletion of the current message (process block 304) in memory 106 will be performed. One way this can be accomplished is by relocating the next available message in memory 106, if any, over the current message location in memory 106. This copying of latter messages to previous messages continues until all successive message(s) have been relocated. Microcontroller 104 then adjusts total message count register in memory 106 accordingly (process block 306). Program flow then continues to the display processing routine in FIG. 4.

If however, the delete keys were not pressed (decision block 302) but the review next message was pressed (decision block 308), incrementing the current message register to the next available message is required (process block 306). If the message counter is currently at the last logged message, an "End of messages" prompt will momentarily be displayed. Microcontroller 104 then resets the current message counter to the first message in memory 106. Program flow then continues to the display processing routine in FIG. 4.

If the delete keys were not pressed (decision block 302) and the review next message was not pressed (decision block 308), decrementing of the current message register to the previous message (process block 310) is required. If however, the message counter is currently at the first logged message, a "No Newer Messages" prompt will momentarily be displayed. Microcontroller 104 then resets the current message counter to the last logged message in memory 106. Program flow then continues to the display processing routine in FIG. 4.

Now let us refer back to FIG. 3. for processing of the user configuration mode(s). There are at least six basic functions the user mode must process. Deleting all messages, setting the clock, setting at least one time interval, enabling or disabling automatic volume, setting a volume corresponding to the time interval and setting the normal volume level. When the menu key is pressed (decision block 300) microcontroller 104 enters the user configuration mode (process block 312).

Microcontroller 104 starts by testing the total message counter for zero. If it is zero, prompting for the deletion of all messages is skipped. If it is not zero, a "Delete All Messages?" type prompt along with the key to accomplish this will be shown on the display. As in previous examples, simultaneously pressing both the review prior messages key 602 and the review next message key 606, will function as a delete key 608. Pressing the delete keys in this mode deletes all messages by simply zeroing message-related registers or counters and scrolls to the next user configuration. If the appropriate delete keys were not pressed, pressing the menu key 604 at this point will also scroll to the next user configuration selection.

Although setting of the internal clock is automatic upon receiving a valid ICLID signal, provisions for initially setting the clock manually have also been made. A message prompting the user to set the internal clock is displayed in conjunction with the current time. The user is also prompted with which keys to use. Typically, the review previous message button 602 is used for scrolling the correct hour while the review next message button 606 is used for scrolling the minutes. Pressing the menu key 604 sets the internal clock, and program flow advances to the next user configuration.

The setting of at least one time interval is done typically in the same manner as setting the internal clock. An appropriate message prompting the user to enter the desired starting time of the interval will be shown on display 112. As in the previous example, the appropriate keys to accomplish this will also be displayed. After scrolling to the correct hour and minute, pressing the menu key 604 saves the starting time to memory 106. Next, an appropriate message prompting the user to enter the desired ending time of the interval will be shown on display 112. The appropriate keys to accomplish this will also be displayed. After scrolling to the correct hour and minute, pressing the menu key 604 saves the ending time to memory 106. The program then advances to the next user configuration.

An "Automatic Volume" prompt including the current status of "Enabled" or "Disabled" will be displayed a long with the key to toggle its status. When the specified toggle key is depressed, display 112 will then be updated to reflect the new status. When the menu key 604 is again pressed, the current status is then saved to memory 106 and program flow advances to the next user configuration.

Setting a corresponding volume level for the previously set time interval(s) is required next. This level may also be referred to as the alternate volume level. A bar graph is displayed on display 112 representing the current alternate level. If however, the current level is zero, a "Muted" or equivalent type message will be displayed in place of the bar graph. The review next key 606 and the review previous key 602 are used to raise and lower the level respectively. Pressing the menu key 604 saves the current value to memory 106 and advances user configuration to setting the normal volume level.

Setting of the normal volume level is processed in the same manner as was the setting of the alternate volume. Once the desired level is achieved, pressing the menu key 604 saves the current value and all other necessary information (process block 314) to memory 106. Processing of the user configuration mode is now complete and program flow now returns to the main operating system in FIG. 2.

Figure 4:
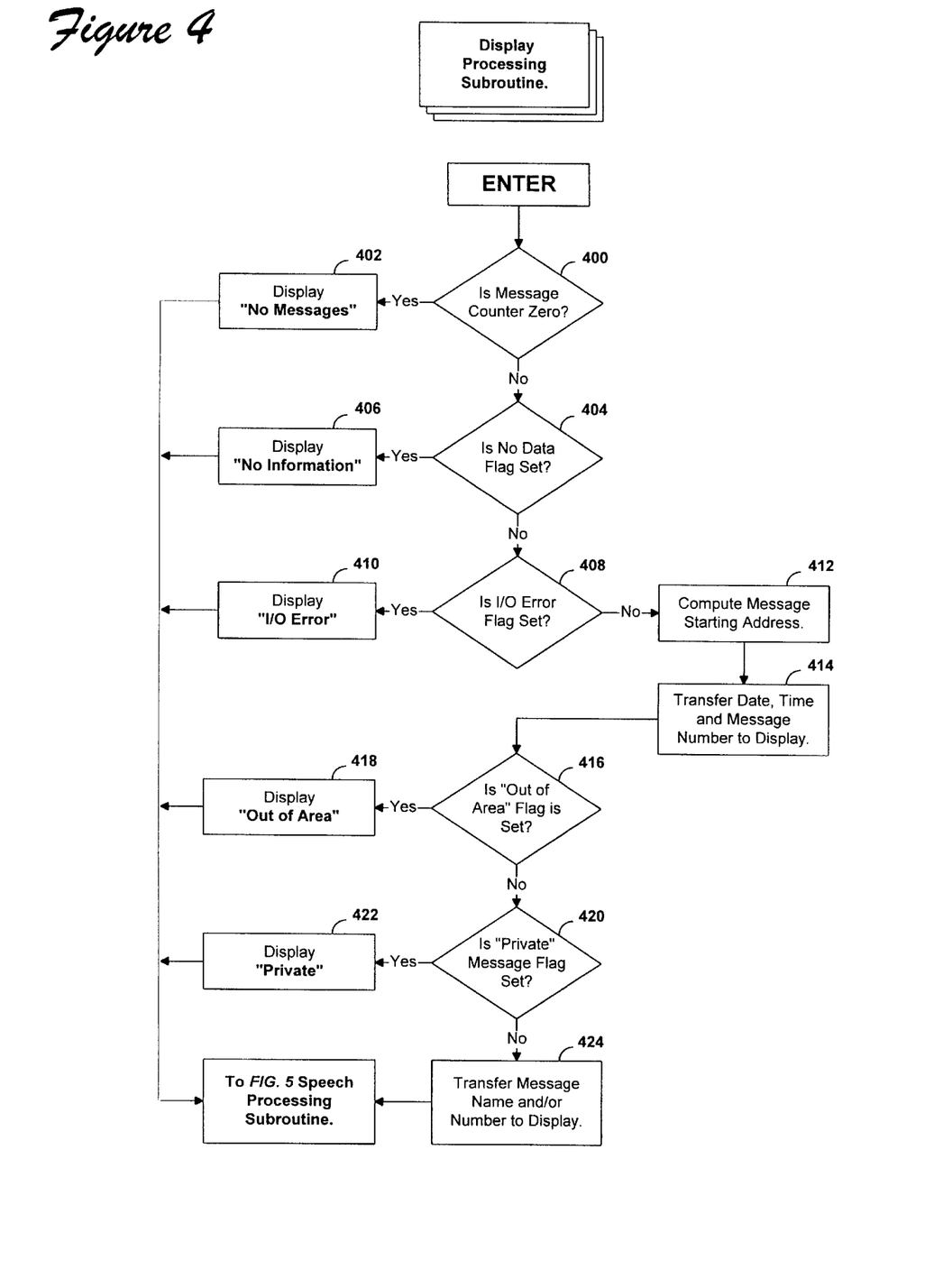
FIG. 4 is a flow chart diagram detailing a message and display processing routine.

FIG. 4 depicts typical program flow of the display processing subroutine. The display subroutine first checks the total message counter to see if it is zero (decision block 400). A zero value would require a "No Messages" or "No Calls" type response (process block 402) to be displayed. If the total message counter is not equal to zero (decision block 400), microcontroller 104 then tests for a no data flag (decision block 404). This flag is set when no data has been received by the ICLID receiver 2. If the no data flag is set (decision block 404), a "No Data" or "No Information" type response (process block 406), will be displayed. If the no data flag has not been set (decision block 404), microcontroller 104 the n checks for the message I/O error flag (decision block 408). If the message I/O error flag is set (decision block 408), an "I/O Error" or "Message in Error" type response (process block 410) will be displayed. If the I/O error flag was not set (decision block 408), computing the current message starting address in memory 106 (process block 412) is then computed. Microcontroller 104 then recovers ICLID data from memory 106 and transfers ICLID date, time and a respective message number (process block 414) to display module 112. Microcontroller 104 then tests if ICLID message is out of the service area (decision block 416). If the out of area flag is set, an "Out of Area" type response (process block 418) will be displayed. If the out of area flag was not set (decision block 416), microcontroller 104 then checks for a private message flag (decision block 420). If the private flag is set (decision block 420), a "Private" or "Blocked" type response (process block 422) is displayed. If the private flag is not set (decision block 420), the ICLID message name and/or number (process block 424) will then be displayed. Program flow now transfers to the speech processing subroutine in FIG. 5.

Figure 5:
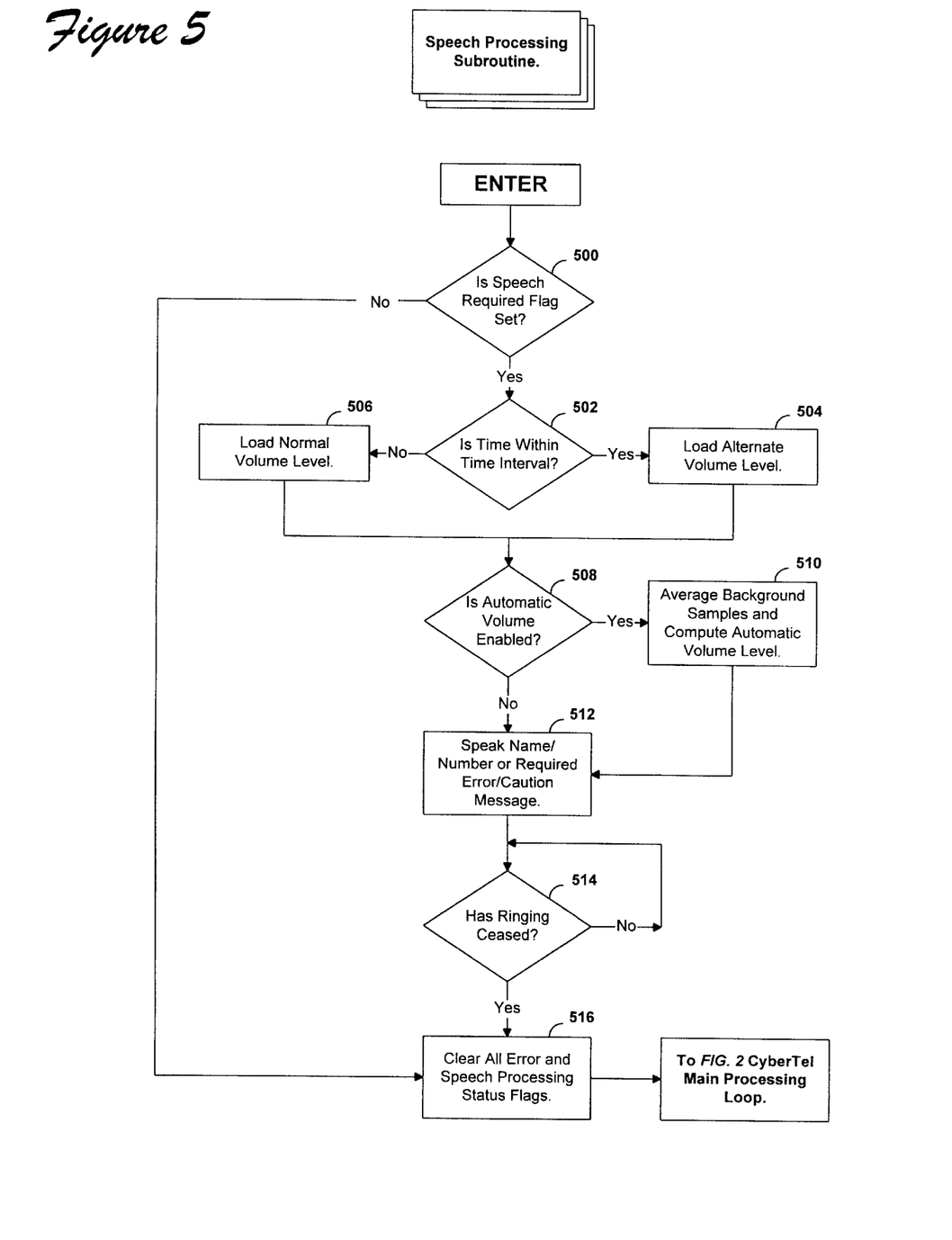
FIG. 5 is a flow chart diagram detailing speech synthesizer and acoustical level processing.

The flow chart depicted in FIG. 5 discloses a representative program flow of the speech processing subroutine. Initially, microcontroller 104 checks if the speech required flag is set (decision block 500). If the speech required flag is not set, all error flags are cleared (process block 516), and program flow exits to the main processing routine in FIG. 2. However, if the speech required flag is set, testing of at least one time interval is now required (decision block 502). If the ICLID time is within at least one user-stored time interval, microcontroller 104 then loads the corresponding alternate volume level (process block 504). If the ICLID time is not within at least one user-stored time interval, microcontroller 104 then loads the user-specified normal volume level (process block 506). Microcontroller 104 then checks whether automatic volume is enabled (decision block 508). If enabled, current averaged background samples are added to the previously loaded level (process block 510) to derive a new volume level. If automatic volume had not been enabled (decision block 508), microcontroller 104 maintains previous computed level (decision block 502).

Microcontroller 104 may now transfer correct digital volume level to resistor ladder network 118. As in the display processing flowchart of FIG. 4, similar processing for error flags is also performed in the speech processing flowchart of FIG. 5 (process block 512). If error/warning flag(s) have been set, the appropriate corresponding error/warning sentence(s) is synthesized. If no error flags were set, synthesizing a leading message prior to the name/number message will be spoken. Typical leading messages such as "Telephone number" or "You have a call from" also help focus the listener's attention for the name and/or number message(s) to follow. Different error, warning and leading sentences are easily changed by simply reprogramming, sampling or replacing speech ram/rom 116A with new speech data samples.

After the last sentence has been synthesized, microcontroller 104 must determine the end of the current call. Microcontroller 104 accomplishes this by monitoring the absence of ring signal duration (decision block 514) from the ICLID receiver interface 102. Microcontroller 104 maintains a continuous loop until the absence of ring signal has surpassed the silent period for a normal ring duration (decision block 514 ). When ringing has ceased, microcontroller 104 resets and/or clears all error and speech processing flags (process block 516). Program flow now returns to the main processing loop of FIG. 2.

While the present invention has been described with respect to what is presently considered to be a preferred embodiment, it is to be understood that the invention is not limited to this enclosed embodiment. On the contrary, the present invention is intended to cover various modifications and equivalent structures included within the spirit and scope of the appended claims:

What is claimed is:

1. Apparatus for processing synthesized speech and synthesizer volume for calling line identification messages comprising:

means for receiving incoming caller identification data;

speech synthesizer means for synthesizing received incoming caller identification data into synthesized speech signals representing received caller identification data;

audio speaker means;

storage means for storing audio volume data;

processing means for processing synthesized speech signals representing received caller identification data and stored audio volume data to create audio signals that, when delivered to said audio speaker means, will cause said audio speaker means to deliver audible speech corresponding to synthesized speech signals representing received caller identification data, at a desired audio volume;

means for delivering the created audio signals to said audio speaker means;

means for sensing ambient background noise to create corresponding background noise data;

means for supplying the corresponding background noise data to said processing means; and wherein said processing means also processes the corresponding background noise data to adjust the created audio signals in accordance with the corresponding background noise data such that the audio speaker means speaks the received caller identification data free of interruption by the sensed ambient background noise and at an audio volume level that exceeds audio volume level represented by the stored audio volume data by audio volume level represented by the background noise data.

2. Apparatus as set forth in claim 1 in which said storage means includes means for storing audio volume data in correlation with time interval data; and said processing means processes synthesized speech signals representing received caller identification data and stored audio volume data to create audio signals in accordance with the particular stored audio volume data correlated with the particular time interval defined by the stored time interval data during which the caller identification data is received.

3. Apparatus as set forth in claim 2 including input means for allowing a user to enter audio volume data correlated with time interval data into said storage means.

4. Apparatus as set forth in claim 1 including an expansion port interface for enabling received caller identification data to be transmitted to a remote device.

5. Method for processing synthesized speech and synthesizer volume for calling line identification messages comprising:

receiving incoming caller identification data;

synthesizing received incoming caller identification data into synthesized speech signals representing received caller identification data;

storing audio volume data;

processing synthesized speech signals representing received caller identification data and stored audio volume data to create audio signals that, when delivered to an audio speaker means, will cause said audio speaker means to deliver audible speech corresponding to synthesized speech signals representing received caller identification data, at a desired audio volume;

delivering the created audio signals to said audio speaker means;

sensing ambient background noise to create corresponding background noise data;

supplying the corresponding background noise data to said processing means; and wherein said processing means also processes the corresponding background noise data to adjust the created audio signals in accordance with the corresponding background noise data such that the audio speaker means speaks the received caller identification data free of interruption by the sensed ambient background noise and at an audio volume level that exceeds audio volume level represented by the stored audio volume data by audio volume level represented by the background noise data.

6. Method as set forth in claim 5 including storing audio volume data in correlation with time interval data; and said processing means processes synthesized speech signals representing received caller identification data and stored audio volume data to create audio signals in accordance with the particular stored audio volume data correlated with the particular time interval defined by the stored time interval data during which the caller identification data is received.

7. Method as set forth in claim 6 including entering audio volume data correlated with time interval data into said storage means.

* * * * *